United States Patent
Spoden

(10) Patent No.: US 7,966,437 B1
(45) Date of Patent: Jun. 21, 2011

(54) WIRELESS USB ENABLED DATALOADS

(75) Inventor: Daniel J. Spoden, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 12/562,877

(22) Filed: Sep. 18, 2009

(51) Int. Cl.
*G06F 13/12* (2006.01)
*G06F 3/00* (2006.01)
*G06F 13/42* (2006.01)
*G06F 15/16* (2006.01)
*G06F 7/00* (2006.01)
*H04L 12/28* (2006.01)

(52) U.S. Cl. .......... 710/106; 710/19; 710/62; 340/5.73; 709/228

(58) Field of Classification Search .................. 710/106, 710/19, 62; 340/5.73; 709/228; 370/400
See application file for complete search history.

(56) References Cited

U.S. PATENT DOCUMENTS

| | | | |
|---|---|---|---|
| 2006/0048196 A1 | 3/2006 | Yau | |
| 2006/0239208 A1* | 10/2006 | Roberts et al. | 370/254 |
| 2007/0073935 A1* | 3/2007 | Kim et al. | 710/62 |
| 2007/0188303 A1* | 8/2007 | Faro et al. | 340/5.73 |
| 2008/0162742 A1* | 7/2008 | Kong et al. | 710/19 |
| 2008/0252459 A1 | 10/2008 | Butler | |
| 2009/0091496 A1 | 4/2009 | Whitehead | |
| 2009/0137275 A1* | 5/2009 | Amirmokri | 455/556.2 |
| 2009/0164644 A1* | 6/2009 | Soderberg et al. | 709/228 |
| 2010/0008503 A1* | 1/2010 | Farley et al. | 380/210 |

* cited by examiner

*Primary Examiner* — Mark Rinehart
*Assistant Examiner* — Christopher A Daley
(74) *Attorney, Agent, or Firm* — Matthew J. Evans; Daniel M. Barbieri

(57) ABSTRACT

A wireless enabled data transferring system for transferring data from a storage device to a slave receiving system. The wireless enabled data transferring system includes a master wireless USB element connectable to a USB port of a storage device. A slave wireless USB element is connectable to a USB port of a slave receiving system. The master wireless USB element and the slave wireless USB element are operably connected to provide data transfer when i) power is applied, ii) the master wireless USB element and the slave wireless USB element are within a predetermined range, and iii) security authentication is established. The slave wireless USB element emulates the data in the storage device as local to the slave wireless USB element.

15 Claims, 2 Drawing Sheets

WIRELESS USB ENABLED DATALOADS

BACKGROUND OF THE INVENTION

1. Field of the Invention

The present invention relates generally to database loading systems and more particularly to an improved wireless database loading system providing wireless, automatic, secure data transfer.

2. Description of the Related Art

Aircraft systems may use database loading units (DBUs) for loading their data into their flight management systems (FMSs). The DBU sold by Rockwell Collins, Inc., Cedar Rapids, Iowa., as the DBU-5000, manufactured by Gables Engineering, Inc., Coral Gables, Fla., performs this data loading functionality by relying upon the physical insertion of a removable media (e.g. USB memory drive) that contains the data files to be dataloaded.

The DBU-5000 data loader function supports the transfer operations between removable media (typically USB 2.0 memory drives) and aircraft Line Replaceable Units (LRUs). The appropriate content must be loaded onto the removable media device. That removable media device must be transported onto the aircraft and physically inserted into the USB port of the DBU. The USB drive has a limited amount of storage capacity. For inspection purposes the USB device has to be available. It cannot be on the plane and with the maintenance personal at the same time. The file has to be physically transferred twice.

The removable media device, if used for other functions, could become corrupted with a computer virus and then be used as a host to launch attacks to corrupt the device the USB is connected to.

The content files containing the dataloads residing on the removable media device, cannot be updated while inserted into the DBU. It is a time consuming task to update the content on the device because the device must be physically removed from the DBU and transported to another device that contains the updated content. That updated content must then be copied onto the device before it is physically returned to the aircraft and the DBU.

The content on the removable media device cannot be monitored from another location.

For example, U.S. Pat. Publicn. No. 20090091496, entitled "GNSS RECEIVER AND EXTERNAL STORAGE DEVICE SYSTEM AND GNSS DATA PROCESSING METHOD," discloses a GNSS system that includes a receiver connected to an external mass storage device. Applications for the system, including GNSS data processing methods, are also disclosed. The external storage device can comprise a flash (thumb) drive, which can be connected to the receiver via a USB interconnection. The combination of a GNSS receiver and a USB flash drive lends itself to many applications that were difficult or inconvenient using previous methods of direct serial output.

SUMMARY OF THE INVENTION

In a broad aspect, the present invention is a wireless enabled data transferring system for transferring data from a storage device to a slave receiving system. The wireless enabled data transferring system includes a master wireless USB element connectable to a USB port of a storage device. A slave wireless USB element is connectable to a USB port of a slave receiving system. The master wireless USB element and the slave wireless USB element are operably connected to provide data transfer when i) power is applied, ii) the master wireless USB element and the slave wireless USB element are within a predetermined range, and iii) security authentication is established. The slave wireless USB element emulates the data in the storage device as local to the slave wireless USB element.

The present invention is particularly adapted for use with aircraft data loading applications, such as the DBU-5000. It obviates the issues regarding physical transferring of files and virus contamination, discussed above. Furthermore, it enhances the ability to update the dataloads and know what is being dataloaded. Data being transferred from the slave element is accessible sooner because there is no time delay to physically transport the remote media to a device that is accessible from other locations.

DETAILED DESCRIPTION OF THE INVENTION

Figure 1:
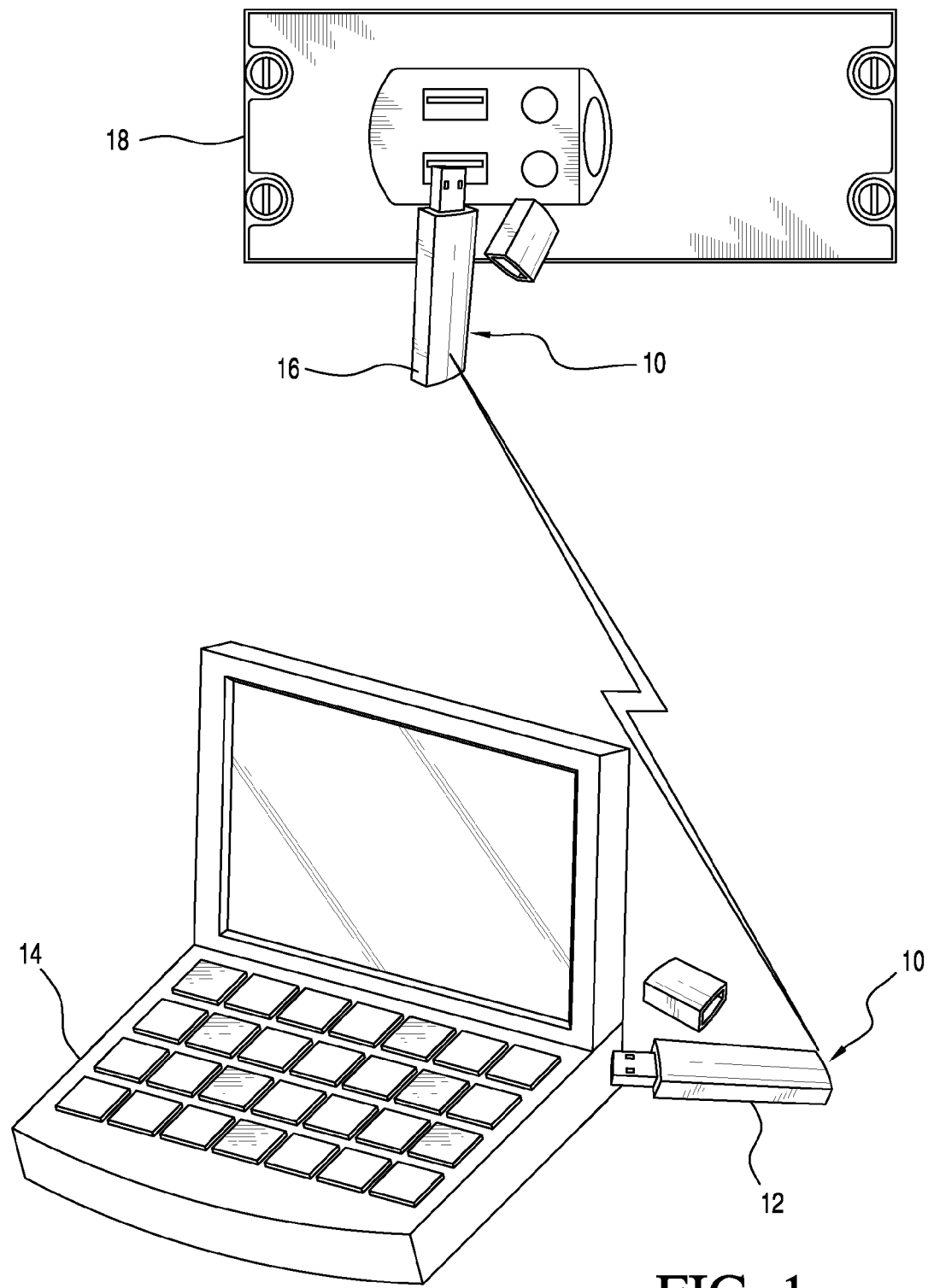
FIG. 1 is a schematic illustration of the wireless enabled data transferring system of the present invention, shown implemented for use with an aircraft database loading unit (DBU) and a personal computer.

Referring now to the drawings and the characters of reference marked thereon, FIG. 1 illustrates the wireless enabled data transferring system of the present invention, designated generally as 10. The wireless enabled data transferring system 10 includes a master wireless USB element 12 connectable to a USB port of a storage device 14; and, a slave wireless USB element 16 connectable to a USB port of a slave receiving system 18. The storage device 14 is typically a personal computer; however, it may be another type of storage device that contains data and file structures, such as a stand alone USB hard drive. The slave receiving system 18 is typically an aircraft database loading unit (DBU).

Figure 2:
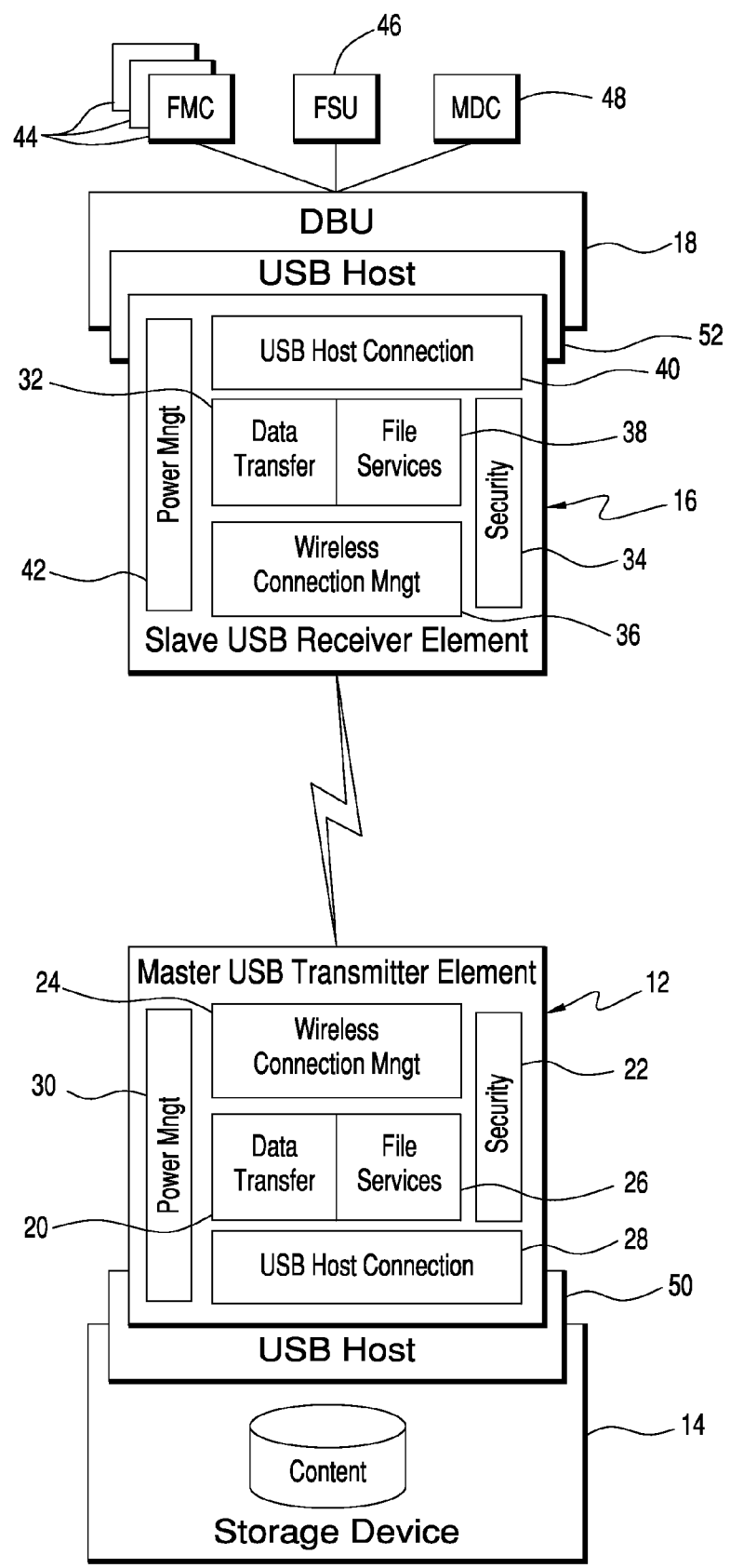
FIG. 2 is a system illustration of the wireless enabled data transferring system as shown implemented with additional aircraft systems.

Referring now to FIG. 2, the master wireless USB element (i.e. USB transmitter element) 12 includes a master data transfer module (DTM) 20 for extracting and packaging data to be transferred to a slave data transfer module (DTM) 36 or receive and unpackage data from the slave data transfer module 36. The master data transfer module (DTM) 20 software interacts with on board memory to provide buffering of data to ensure the transfer flows at a constant rate and does not become starved of data, or loses transferred data when there is a difference between transfer and write capability.

A master security module 22 communicates with a slave security module 34 on the slave wireless USB element 16 to establish the security authentication for implementing a desired secure file transfer mechanism with the slave wireless USB element 16.

A master wireless connection manager module (WCMM) 24 sends and receives data from the slave wireless USB module 16. The master WCMM 24 provides the necessary functionality to transmit data wirelessly from the master DTM 20 to a slave WCMM 36 on the slave wireless USB element 16. The master and slave WCMMs 24, 36, reside on a USB radio and antenna system chip and perform the functions associated with establishing wireless communication and transmitting and receiving wireless traffic.

The master and slave security modules 22, 34 may be embedded software that perform authentication and all security related functions by communicating through the WCMMs to the other security module (i.e., master security module to slave security module, and visa versa).

The master and slave data transfer modules (DTM), 20, 32, are typically software that read the data from the attached device and transfer the data to the other element. Each DTM interacts with a WCMM to transfer data and utilizes a memory buffer on the USB device to provide buffering of data to ensure the transfer between wireless USB elements flows at a constant rate.

A master file services module (FSM) 26 emulates the directory/file structure on the storage device 14 by communicating the structure to a slave FSM 38. The master and slave file services modules (FSM) 26, 38 are typically software that enable the slave wireless element to emulate the directory and file structure residing on the storage device 14 as if it were local to the slave wireless USB element 16.

A master USB host connection module 28 communicates with the storage device 14. The master and slave USB host connection modules 28, 40 are typically software that provide standard USB connection functionality.

A master power management module 30 provides a source of power to the master wireless USB element 12. The master and slave power management modules 30, 42, perform standard USB power management associated with the supply, typically up to 6 A at either 5 V, 12 V, or 24 V.

Thus, the master data transfer module 20, the master security module 22, the master wireless connection management module 24, the master file services module 26, the master USB host connection module 28, and the master power management module 30 are operatively interconnected.

In summary, the slave wireless USB element 16 includes the slave data transfer module 32 that packages data to be transferred to the storage device 14 and receives packaged data from the master DTM 20. The slave security module 34 establishes the security authentication for implementing a desired secure file transfer mechanism with the master wireless USB element 12. The slave security module 34 may utilize, for example, peer-to-peer networking techniques so the receiving device will only communicate with a specific transmitter, based on defined characteristics such as MAC address. Certificate processing networking techniques could be used, such as x.509. Encryption processing networking techniques could also be used. The slave wireless connection management module 36 receives data from the master wireless USB element 12 and sends it to the slave data transfer module 32. The slave file services module 38 emulates the directory/file structure on the storage device 14 as local to the slave receiving system 18. The slave USB host connection module 40 communicates with the slave receiving system 18. The slave power management module 42 provides a source of power to the slave wireless USB element 16. The slave data transfer module 32, the master security module 34, the slave wireless connection management module 36, the slave file services module 38, the slave USB host connection module 40, and the slave power management module 42 are operatively interconnected.

In operation, the master and slave WCMMs 24, 36 establish a wireless communication link between the wireless USB elements, when the boundary conditions for power and distance have been met. After a communication link has been established the security modules of the master and slave communicate to authenticate and establish the necessary security level for all future communication. Once the two USB elements have established a secure communication link the file services modules communicate to provide the root directory and file structure of the storage device to the slave file services module. Upon completion of these communications the slave wireless USB element initiates an instantiation with the DBU in a manner that emulates the insertion of the USB into the DBU. At this point the DBU is aware of the USB device and can read the directory/file structure from which to select a file to use for dataloading, as if the file exists locally on the slave wireless USB element. When the DBU requests a file from the slave wireless USB element the request is handled by the data transfer module. The slave data transfer module communicates with the master data transfer module through the WCM to retrieve the selected file from the storage device. The master data transfer module extracts the data from the selected file, and works with the security module to securely package the data for transfer to the slave DTM. The slave DTM retrieves the data packets and works with the slave security module to unpackage the data and ensure the data is valid. The data is then transferred to the DBU to satisfy the DBU's request. Writing a file that is located on an LRU to the storage device is performed utilizing the DTM of the slave and master. The file is streamed from the DBU to the slave DTM which, in turn, packets the data and works with the slave security module to secure the packaged data. The data is then transferred to the master DTM, which unpackages the data and ensures the data is valid before writing the data to the storage device 14. Other file operations are accomplished through similar communications between the slave and master wireless elements.

The master and slave USB devices may connect to their representative host through, for example, standard USB hosts 50, 52 that adhere to the protocols identified in the Universal Serial Bus Specification Revision 2.0 at http://www.usb.org/developers/docs/.

The data transfer between the master wireless USB element and the slave wireless USB element is preferably by Ultra-WideBand (UWB) communication. Certified Wireless USB operates in the frequency range of 3.1 to 10.6 GHz. This capability may be supplied by, for example, a Wisair WSR601 Single chip CMOS; a Samsung Electronics Co. W-USB System-On-Chip (SoC) wireless universal serial bus (W-USB); an NEC uPD720171, Wireless Universal Serial Bus (Wireless USB) host controller; or, Jungo USBware™ protocol software stack. These elements adhere to the Universal Serial Bus Specifications, noted above.

During operation, the master wireless USB element 12 and the slave wireless USB element 16 are operably connected to provide data transfer when i) power is applied, ii) the master wireless USB element and the slave wireless USB element are within a predetermined range, and iii) security authentication is established. Such a predetermined range is a range within about three meters. The slave wireless USB element 16 emulates the data in the storage device 14 as local to the slave wireless USB element 16.

As an example of operation, the LRU data load request initiates a read file request from an LRU that causes the DBU to perform a read operation on the specified file. The slave data transfer module 32 communicates with the master data transfer module 20 through the WCMMs 24, 36 to retrieve the selected file from the storage device 14. The master data transfer module 20 extracts the data from the selected file on the storage device, and works with the security module 22 to securely package the data to be transferred to the slave DTM 32. The slave DTM 32 retrieves the data and works with the slave security module 34 to unpackage the data and ensure the data is valid. The data is then transferred to the DBU to satisfy the DBU's request, which in turn sends that block of data to the LRU.

The DBU-5000 provides the capability to read directories, read files, write files, rename files and delete files stored on the removable media. By providing wireless connectivity to the content residing in files and directory on a remote PC/Storage Device the need to move content to a USB removable media and physically transport that USB device onto the aircraft is not necessary.

During directory operations, the DBU sends a directory entry for each subdirectory name found in the root directory to an Available Load page associated with the Human User Interface (HMI). The Available Load page allows a data load to be initiated for an LRU. This page displays a list of all available load sets for this LRU that are contained on the storage devices, as well as any files that can be written by the LRU to the storage devices. By providing a wireless connection to the physical storage device there exists a wide array of possible methods to populate the storage device, such as wired network connections. Cellular connections, wireless 802.11 connections, removable storage devices, etc. The advantage is that content can quickly be updated on the fly without having to redistribute that content to a USB device.

The files from LRUs are written to the storage device if that storage device is a PC that is connected to a network. Via that network connection those files become available anywhere. When the storage device is a PC that is connected to a network it is possible to know exactly what content is available for dataloading without physically being on the aircraft.

The DBU 18 is connected to LRUs such as the Right Management Computers (FMC's) 44, File Server Unit (FSU) 46; and, Maintenance Diagnostic Computer (MDC) 48.

Other embodiments and configurations may be devised without departing from the spirit of the invention and the scope of the appended claims.

For example, although the present invention has been implemented in an aircraft data loading environment, the principles herein can be implemented in a variety of different environments. For example, the present invention can be implemented in a Personnel Area Network (PAN) within the range of 10 m through the frequency band between 3 GHz and 10 Ghz. It can be used, for example, to distribute software and content in an office or home environment. It can be used to deliver secure content for media applications on a PC such as Windows Media Player, without actually moving the file.

The invention claimed is:

1. A wireless enabled data transferring system for transferring data from a storage device to a slave receiving system, comprising:
    a) a master wireless USB element connectable to a USB port of a storage device; and,
    b) a slave wireless USB element connectable to a USB port of a slave receiving system,
    wherein said master wireless USB element comprises:
        a) a master data transfer module for extracting and packaging data to be transferred to a slave data transfer module or receive and unpackage data from the slave data transfer module;
        b) a master security module for communicating with a slave security module for establishing the security authentication for implementing a desired secure file transfer mechanism between said master and said slave wireless USB element;
        c) a master wireless connection manager module for sending and receiving data from said slave wireless USB element;
        d) a master file services module for emulating the directory/file structure of the storage device as if it were local to the slave wireless USB element;
        e) a master USB host connection module for performing standard USB communication with a USB host; and,
        f) a master power management module for providing a source of power to said master wireless USB element,
        wherein said master data transfer module, said master security module, said master wireless connection manager module, said master file services module, said master USB host connection module, and said master power management module are operatively interconnected; and,
    wherein said slave wireless USB element comprises:
        a) a slave data transfer module for extracting and packaging data to be transferred to said master data transfer module or receive and unpackage data from said master data transfer module;
        b) a slave security module for establishing the security authentication for implementing a desired secure file transfer mechanism with said master wireless USB element;
        c) a slave wireless connection manager module for sending and receiving data from said master wireless USB element;
        d) a master slave file services module for emulating the directory/file structure of the storage device as local to the slave receiving system;
        e) a slave USB host connection module for performing standard USB communication with a USB host; and,
        f) a slave power management module for providing a source of power to said slave wireless USB element,
        wherein said a slave data transfer module, said master security module, said slave wireless connection manager module, said slave file services module, said slave USB host connection module, and said slave power management module are operatively interconnected, and
    wherein said master wireless USB element and said slave wireless USB element are operably connected to provide data transfer when i) power is applied, ii) the master wireless USB element and said slave wireless USB element are within a predetermined range, and iii) security authentication is established, said slave wireless USB element emulating the data in said storage device as local to said slave wireless USB element.

2. The wireless enabled data transferring system of claim 1, wherein said slave security module utilizes peer-to-peer networking techniques.

3. The wireless enabled data transferring system of claim 1, wherein said slave security module utilizes certificate processing networking techniques.

4. The wireless enabled data transferring system of claim 1, wherein said slave security module utilizes encryption processing networking techniques.

5. The wireless enabled data transferring system of claim 1, wherein data transfer between said master wireless USB element and said slave wireless USB element is by Ultra-Wide-Band (UWB) communication.

6. The wireless enabled data transferring system of claim 1, wherein said slave receiving element is connectable to a USB port of a slave receiving system comprising an aircraft database loading unit (DBU).

7. The wireless enabled data transferring system of claim 1, wherein said storage device comprises a portable computer.

8. The wireless enabled data transferring system of claim 1, wherein said predetermined range is within about three meters.

9. The wireless enabled data transferring system of claim 1, wherein connections between said storage device and said master wireless USB element; and, between said slave receiving system and said slave wireless USB element is through standard USB hosts that conform to Universal Serial Bus Specification Revision 2.0.

10. A method for transferring data from a storage device to a slave receiving system, comprising the steps of:
   a) providing a master wireless USB element connectable to a USB port of a storage device;
   b) providing a slave wireless USB element connectable to a USB port of a slave receiving system,
      wherein said master wireless USB element comprises:
         i) a master data transfer module for extracting and packaging data to be transferred to a slave data transfer module or receive and unpackage data from the slave data transfer module;
         ii) a master security module for communicating with a slave security module for establishing the security authentication for implementing a desired secure file transfer mechanism between said master and said slave wireless USB element;
         iii) a master wireless connection manager module for sending and receiving data from said slave wireless USB element;
         iv) a master file services module for emulating the directory/file structure of the storage device as if it were local to the slave wireless USB element;
         v) a master USB host connection module for performing standard USB communication with a USB host; and,
         vi) a master power management module for providing a source of power to said master wireless USB element,
         wherein said master data transfer module, said master security module, said master wireless connection manager module, said master file services module, said master USB host connection module, and said master power management module are operatively interconnected; and,
      wherein said slave wireless USB element comprises:
         i) a slave data transfer module for extracting and packaging data to be transferred to said master data transfer module or receive and unpackage data from said master data transfer module;
         ii) a slave security module for establishing the security authentication for implementing a desired secure file transfer mechanism with said master wireless USB element;
         iii) a slave wireless connection manager module for sending and receiving data from said master wireless USB element;
         iv) a master slave file services module for emulating the directory/file structure of the storage device as local to the slave receiving system;
         v) a slave USB host connection module for performing standard USB communication with a USB host; and,
         vi) a slave power management module for providing a source of power to said slave wireless USB element,
         wherein said master data transfer module, said master security module, said master wireless connection manager module, said master file services module, said master USB host connection module, and said master power management module are operatively interconnected; and,
   c) providing data transfer when i) power is applied to said master wireless USB element and said slave wireless USB element; ii) the master wireless USB element and said slave wireless USB element are within a predetermined range, and iii) security authentication is established, said slave wireless USB element emulating the data in said storage device as local to said slave wireless USB element.

11. The method of claim 10, wherein said step of utilizing a slave security module comprises the step of utilizing peer-to-peer networking techniques.

12. The method of claim 10, wherein said step of utilizing a slave security module comprises the step of utilizing certificate processing networking techniques.

13. The method of claim 10, wherein said step of utilizing a slave security module comprises the step of utilizing encryption processing networking techniques.

14. The method of claim 10, wherein said step of providing data transfer comprises utilizing Ultra-WideBand (UWB) communication.

15. A wireless enabled data transferring system for transferring data from a portable computer to an aircraft database loading unit (DBU), comprising:
   a) a master wireless USB element connectable to a USB port of a portable computer; and,
   b) a slave wireless USB element connectable to a USB port of an aircraft database loading unit (DBU),
      wherein said master wireless USB element comprises:
         a) a master data transfer module for extracting and packaging data to be transferred to a slave data transfer module or receive and unpackage data from the slave data transfer module;
         b) a master security module for communicating with a slave security module for establishing the security authentication for implementing a desired secure file transfer mechanism between said master and said slave wireless USB element;
         c) a master wireless connection manager module for sending and receiving data from said slave wireless USB element;
         d) a master file services module for emulating the directory/file structure of the storage device as if it were local to the slave wireless USB element;
         e) a master USB host connection module for performing standard USB communication with a USB host; and,
         f) a master power management module for providing a source of power to said master wireless USB element,
         wherein said master data transfer module, said master security module, said master wireless connection manager module, said master file services module, said master USB host connection module, and said master power management module are operatively interconnected; and,
      wherein said slave wireless USB element comprises:
         a) a slave data transfer module for extracting and packaging data to be transferred to said master data transfer module or receive and unpackage data from said master data transfer module;
         b) a slave security module for establishing the security authentication for implementing a desired secure file transfer mechanism with said master wireless USB element;
         c) a slave wireless connection manager module for sending and receiving data from said master wireless USB element;
         d) a master slave file services module for emulating the directory/file structure of the storage device as local to the slave receiving system;
         e) a slave USB host connection module for performing standard USB communication with a USB host; and, f) a slave power management module for providing a source of power to said slave wireless USB element, wherein said a slave data transfer module, said master security module, said slave wireless connection manager module, said slave file services module, said slave USB host connection module, and said slave power management module are operatively interconnected, and wherein said master wireless USB element and said slave wireless USB element are operably connected, via Ultra-WideBand (UWB) communication, to provide data transfer when i) power is applied, ii) the master wireless USB element and said slave wireless USB element are within a predetermined range, and iii) security authentication is established, said slave wireless USB element emulating the data in said portable computer as local to said slave wireless USB element.

* * * * *